United States Patent
De Sisti et al.

(10) Patent No.: US 7,322,706 B2
(45) Date of Patent: Jan. 29, 2008

(54) DEVICE FOR ADJUSTING LIGHT INTENSITY FOR DISCHARGE LAMP PROJECTORS

(75) Inventors: Mario De Sisti, Albano Laizale (IT); Fabio De Sisti, Albano Laizale (IT)

(73) Assignee: De Sisti Lighting S.p.A., Rome (IT)

( * ) Notice: Subject to any disclaimer, the term of this patent is extended or adjusted under 35 U.S.C. 154(b) by 0 days.

(21) Appl. No.: 10/854,225

(22) Filed: May 27, 2004

(65) Prior Publication Data

US 2005/0007560 A1 Jan. 13, 2005

(30) Foreign Application Priority Data

May 30, 2003 (IT) .......................... RM2003A0271

(51) Int. Cl.
- G03B 21/14 (2006.01)
- G03B 21/28 (2006.01)
- G03B 21/20 (2006.01)
- G02F 1/1335 (2006.01)
- F21S 8/00 (2006.01)

(52) U.S. Cl. .................... 353/97; 353/98; 353/101; 353/102; 349/67; 362/281; 362/328

(58) Field of Classification Search .................. 353/34, 353/37, 97, 98, 100, 101, 102, 119; 362/268, 362/281, 328, 335, 636, 298, 398; 349/61, 349/67; 359/636

See application file for complete search history.

(56) References Cited

U.S. PATENT DOCUMENTS

| | | | |
|---|---|---|---|
| 1,955,599 A * | 4/1934 | Lamblin-Parent | 362/215 |
| 2,558,964 A | 7/1951 | Kliegl | |
| 4,232,359 A * | 11/1980 | Leon et al. | 362/268 |
| 4,338,654 A | 7/1982 | Logothetis | |
| 4,517,630 A * | 5/1985 | Dieffenbach et al. | 362/509 |
| 4,770,525 A * | 9/1988 | Umeda et al. | 353/122 |
| 5,833,341 A * | 11/1998 | Kimura et al. | 353/98 |
| 2005/0135106 A1* | 6/2005 | Kittelmann et al. | 362/326 |
| 2005/0162750 A1* | 7/2005 | Kittelmann et al. | 359/636 |
| 2005/0168995 A1* | 8/2005 | Kittelmann et al. | 362/328 |

FOREIGN PATENT DOCUMENTS

EP 0 402 845 12/1990

* cited by examiner

Primary Examiner—Melissa Jan Koval
(74) Attorney, Agent, or Firm—Dickstein, Shapiro, LLP.

(57) ABSTRACT

The invention relates to a device for adjusting light intensity for discharge lamp projectors with an optical assembly that contains a spherical mirror and a discharge lamp, and a Fresnel lens provided in front of the lamp of the optical assembly. The device is characterized in that an iris diaphragm (5) is provided on the optical assembly, in front of the lamp, in correspondence with the focus of the optical assembly.

2 Claims, 1 Drawing Sheet

DEVICE FOR ADJUSTING LIGHT INTENSITY FOR DISCHARGE LAMP PROJECTORS

FILED OF THE INVENTION

The present invention relates to a device for adjusting light intensity for discharge lamp projectors.

More specifically, the invention relates to a device for adjusting light intensity for discharge lamp projectors that allows to obtain an adjustment of intensity avoiding all the drawbacks of the known systems.

BACKGROUND OF THE INVENTION

As it is well known, an operation of discharge lamps is based on a voltaic arc determined by the discharge between two electrodes. It is also known that it is not possible to obtain in this type of lamps an adjustment of intensity in the range between 0% and 100%, which is possible with filament lamps, since it would cause the switching off of the arc and in any case a very unstable operation at the intermediate power values.

At present, to obtain the adjustment of the light intensity of the discharge lamp, a mechanical shutter is mounted in front of the projector, making it possible to vary the light intensity, blocking the light rays emitted from the projector.

This kind of solution, even though it has been used for many years, is characterized by some drawbacks, among which possible to mention is a remarkable increase of weight, sizes and unbalancing of the weight with respect to the fulcrum of the projector, as well as a remarkable increase of total costs.

Mainly, said solution induces geometric aberrations of the emitted light beam, reducing the light efficiency of the projector when the shutter is fully open.

SUMMARY OF THE INVENTION

In view of the above, it is well evident that the advantage of having at disposal a device as the one suggested according to the present Invention, allows to solve all the above mentioned problems.

Thus, the specific object of the present invention is to provide a device for adjusting light intensity for discharge lamp projectors comprising an optical assembly comprised of a discharge lamp and a spherical mirror, and of a Fresnel lens, provided in front of the lamp of said optical assembly.

Preferably, according to the invention, said optical assembly is movable along a longitudinal axis between two different foci, respectively, a "flood" or "large beam" point and a "spot" or "narrow beam" point.

DETAILED DESCRIPTION OF THE INVENTION

Figure 1:
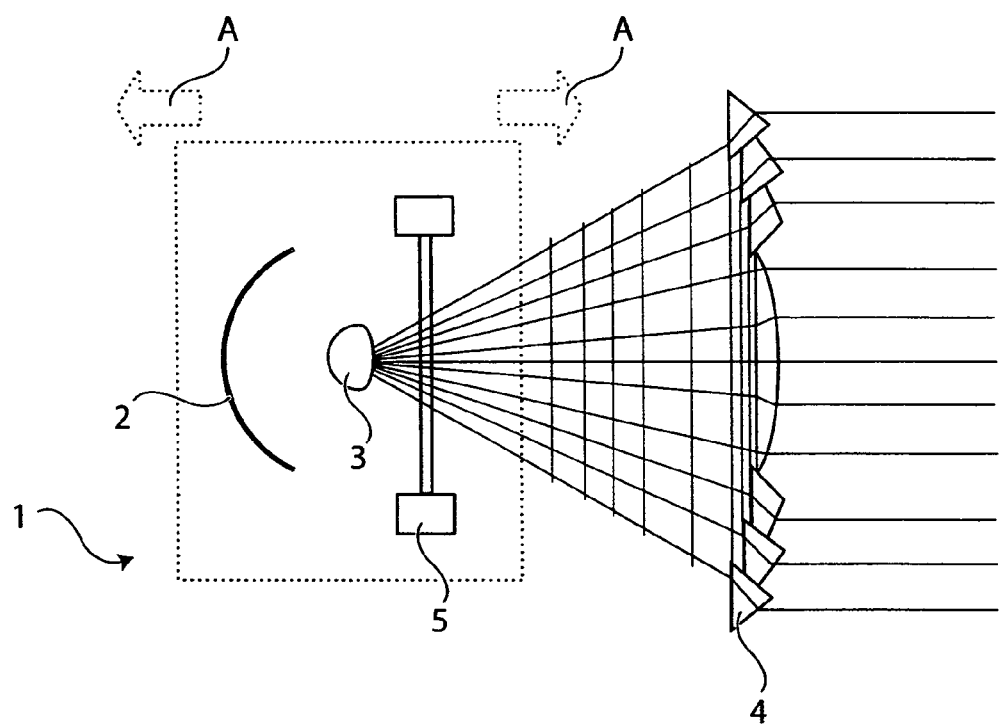
FIG. 1 is a schematic diagram showing an embodiment of the device of the present invention.

The present invention will be now described, for illustrative but not limitative purposes, according to its preferred embodiment, with particular reference to FIG. 1 showing a schematic view of an embodiment.

Observing now FIG. 1 that shows a device according to the invention, provided is an optical assembly 1, comprising a spherical mirror 2 and a lamp 3, said assembly being movable according to arrows A shown in the figure.

In front of the movable assembly 1, provided is a Fresnel lens 4, that must create the light beam.

According to the invention, an iris diaphragm 5 is provided on said optical assembly, in correspondence with the focus of the lamp 3.

The use of an iris diaphragm 5 provided close to the lamp 3 within a Fresnel 4 lens projector, interposed between the optical assembly 1 inside the projector and the lens 4, and integral with the movable element, is the most characteristic feature according to the invention.

As it is well known, in a Fresnel lens, the assembly 1 must be moved between two foci, to allow the variation of the opening of the light beam emitted from the projector (i.e., FLOOD, =large beam, which is emitted when optical assembly 1 is placed close to the lens 4; SPOT=narrow beam, which is emitted when optical assembly 1 is placed on the focus farther from the lens 4).

During this run, serving to focus the beam, the incidence angle of the concentric light rays emitted from the inner optical assembly 1 (lamp 3 and mirror 2) to the lens varies.

By using an iris diaphragm 5 that is provided close to the light source 3 and moves integrally with the light source along the optical axis, the focus of the optical assembly is reproduced at the centre of the iris, allowing a modulation of the light amount without altering the geometry and the direction of the (concentric) light rays, by simply blocking the amount of the light rays.

In summary, the device according to the invention allows to adjust light intensity (dimmer effect) by acting on the light rays emitted from the inner optical assembly 1 without modifying the direction of the light rays and without creating any shadow, since the device acts on the beam before the latter reaches the Fresnel lens 4.

By the device according to the invention, a type of mechanical optical-dimmer that is integrated within the projector has been realized, so that a weight, cost and size reduction is obtained in comparison with known solutions providing mechanical dimmers mounted in front of the projectors.

Furthermore, by the solution according to the invention, photometric features, uniformity of emitted light and light efficiency of the projector are preserved without being influenced by the presence of the inventive device. Since iris is fully open, the spot and flood values of light intensity, amplitude and uniformity of the light beam correspond to those of the same standard projector without mechanical dimmer. This result could not be obtained by the conventional mechanical dimmers, since they are mounted after the Fresnel lens in the light pathway, thereby introducing optical aberrations (not uniform light beam) and, according to the various specific cases, often influence the light emission by reducing its Intensity, even when they are completely open (for example horizontal or vertical blade shutters).

Furthermore, thanks to the intrinsic design economy of the system with respect to what is available today on the market, the solution according to the invention, allows to expand the use of an energy saving technology to different professional fields (e.g., video production, movies, events, fashion, shows, theatre and architecture) when used on small-size projectors that are mounted with various types of low electric power and high luminous efficiency discharge lamps available on the market.

The present invention has been described above for illustrative but not limitative purposes, according to its preferred embodiments, but it is to be understood that modifications and/or changes can be introduced by those skilled in the art without departing from the relevant scope as defined in the claims below.

The invention claimed is:

1. A device for adjusting light intensity for discharge lamp projectors, comprising an optical assembly comprised of a discharge lamp and a spherical mirror and having a single focus, an iris diaphragm, and a Fresnel lens provided in front of the lamp of said optical assembly, wherein said iris diaphragm is provided on said optical assembly, interposed between the lamp and the Fresnel lens, and in correspondence with the focus of said optical assembly, and said optical assembly and said iris diaphragm are integrally movable along a longitudinal axis between two different foci, a "flood" or "large beam" point and a "spot" or "narrow beam" point, respectively.

2. The device according to claim 1, wherein said iris diaphragm is integrated with said optical assembly.

* * * * *